United States Patent
Hsiao

(10) Patent No.: US 7,659,917 B2
(45) Date of Patent: Feb. 9, 2010

(54) METHOD FOR LABELING OPTICAL DISC

(75) Inventor: Yi-Long Hsiao, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 315 days.

(21) Appl. No.: 11/944,432

(22) Filed: Nov. 22, 2007

(65) Prior Publication Data

US 2008/0129814 A1    Jun. 5, 2008

(30) Foreign Application Priority Data

Nov. 30, 2006   (TW) ............................. 95144621 A

(51) Int. Cl.
*B41J 2/435* (2006.01)
*G11B 23/40* (2006.01)

(52) U.S. Cl. ..................................... 347/224

(58) Field of Classification Search ................. 347/224; 369/30.01, 30.03, 30.04
See application file for complete search history.

(56) References Cited

U.S. PATENT DOCUMENTS

2005/0265211 A1*  12/2005  Nakane et al. ........... 369/275.1
2008/0152412 A1*  6/2008  Shoji et al. ................... 400/76

* cited by examiner

*Primary Examiner*—Huan H Tran
(74) *Attorney, Agent, or Firm*—Winston Hsu

(57) ABSTRACT

A method for labeling an optical disc includes the following steps: receiving a command of a light scribe application program of a host to start labeling, reading an indication area of the optical disc to obtain information of labeling, transmitting the information of labeling to the host, and planning blocks capable of being labeled in the drawing area of the optical disc by the host. If planning the blocks capable of being labeled fails, labeling stops; and if planning the blocks capable of being labeled is successful, the drawing area of the optical disc is labeled, an indication is recorded at the indication area of the optical disc corresponding to the labeled block, and labeling then stops.

20 Claims, 4 Drawing Sheets

METHOD FOR LABELING OPTICAL DISC

BACKGROUND OF THE INVENTION

1. Field of the Invention

The invention relates to a method for labeling optical discs, and more particularly, to a labeling method of recording a location of each label in order to multi-label the optical discs.

2. Description of the Prior Art

Ordinarily, a typical disc has two sides, where one side is a data recording side and the other side is a label side. In a conventional method for labeling optical discs, users write on the label side directly using markers, or disc manufacturers add label data (e.g. pictures or letters) relating to logo and data content of the disc on the label side utilizing spray printing techniques or pasting adhesive tape.

Regarding the above methods, the label data is rough and easily falls off, which affects disc rotation. Therefore, a light scribe method is another conventional method for labeling optical discs. As illustrated in FIG. 1, the label data 1 required by users is scribed as an identification label on the label side 3 of the optical disc 2 by a laser beam emitted from a pickup head of an optical disc drive (not shown). While labeling, the optical disc 2 is placed upside down, and the label side 3 faces the pickup head. The users utilize the light scribe application program in a host (e.g. a computer) to control the pickup head to scribe the label data selected by the users onto the label side 3 for identifying the optical disc.

The conventional light scribe method, however, does not record the location of each label data. An optical disc can only be scribed once in order to prevent label data scribed in different operations overlapping each other, which influences identification of the label data. When the optical disc is multi-burned, the optical disc cannot be scribed again to renew the label data, even though there are blank blocks (free space) on the label side of the optical disc. This is inconvenient for users. The conventional methods, therefore, are in need of solutions for multi-labeling optical discs.

SUMMARY OF THE INVENTION

An object of the invention is to provide a method for labeling an optical disc. The method forms an indication area corresponding to the drawing area to record the location of label data through utilizing an existing location on the label side of the optical disc that is available for labeling.

The method records the location of label data labeled in each labeling operation. Therefore, the blank block of the label side can be labeled with new label data when multi-labeling.

To achieve the above-mentioned objective, the method for labeling an optical disc comprises the following steps: receiving a command of the light scribe application program of a host to start labeling, reading the indication area of the optical disc to obtain the information of labeling, transmitting the information of labeling to the host, and planning blocks capable of being labeled in the drawing area of the optical disc by the host. If the host fails to successfully plan the blocks capable of being labeled, the method stops labeling; if planning the blocks capable of being labeled is successful, however, the method labels the drawing area of the optical disc, records the indication at the indication area of the optical disc corresponding to the labeled block, and then stops labeling.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
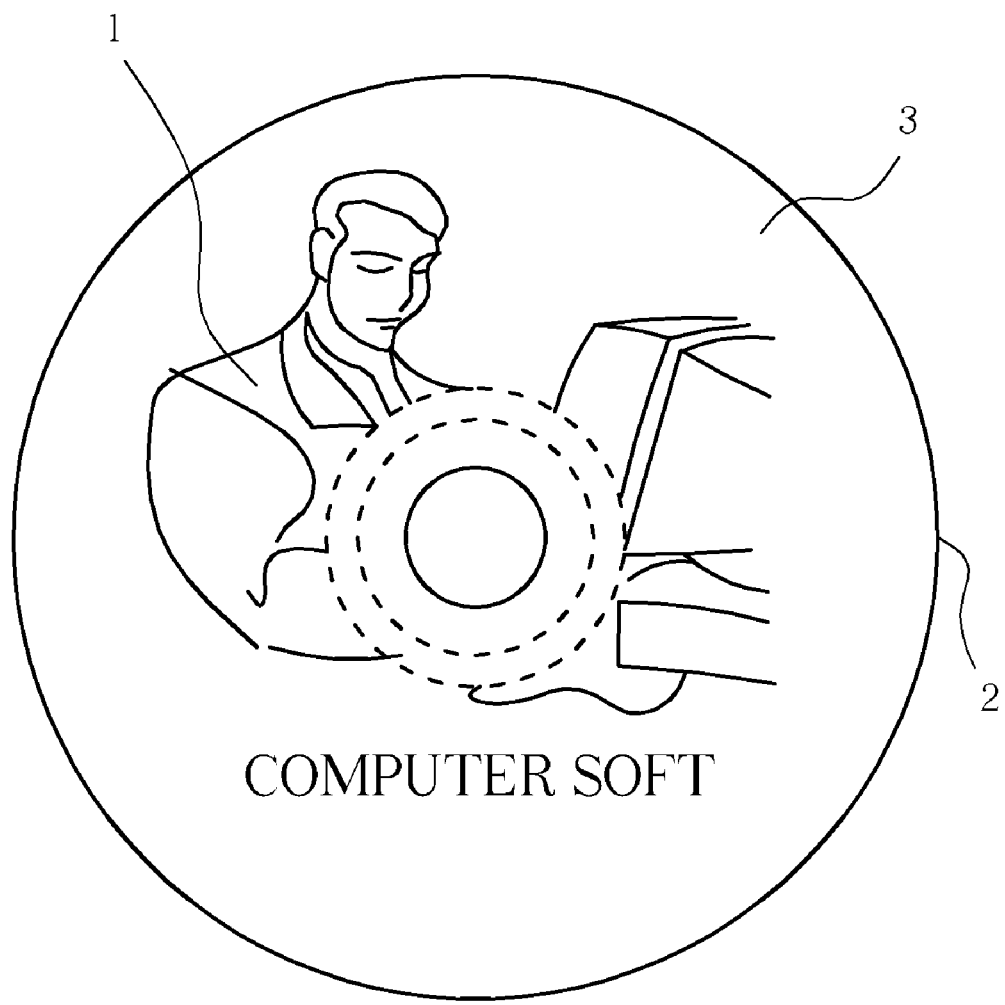
FIG. 1 is a diagram illustrating a label on an optical disc labeled by the conventional method.
Figure 2:
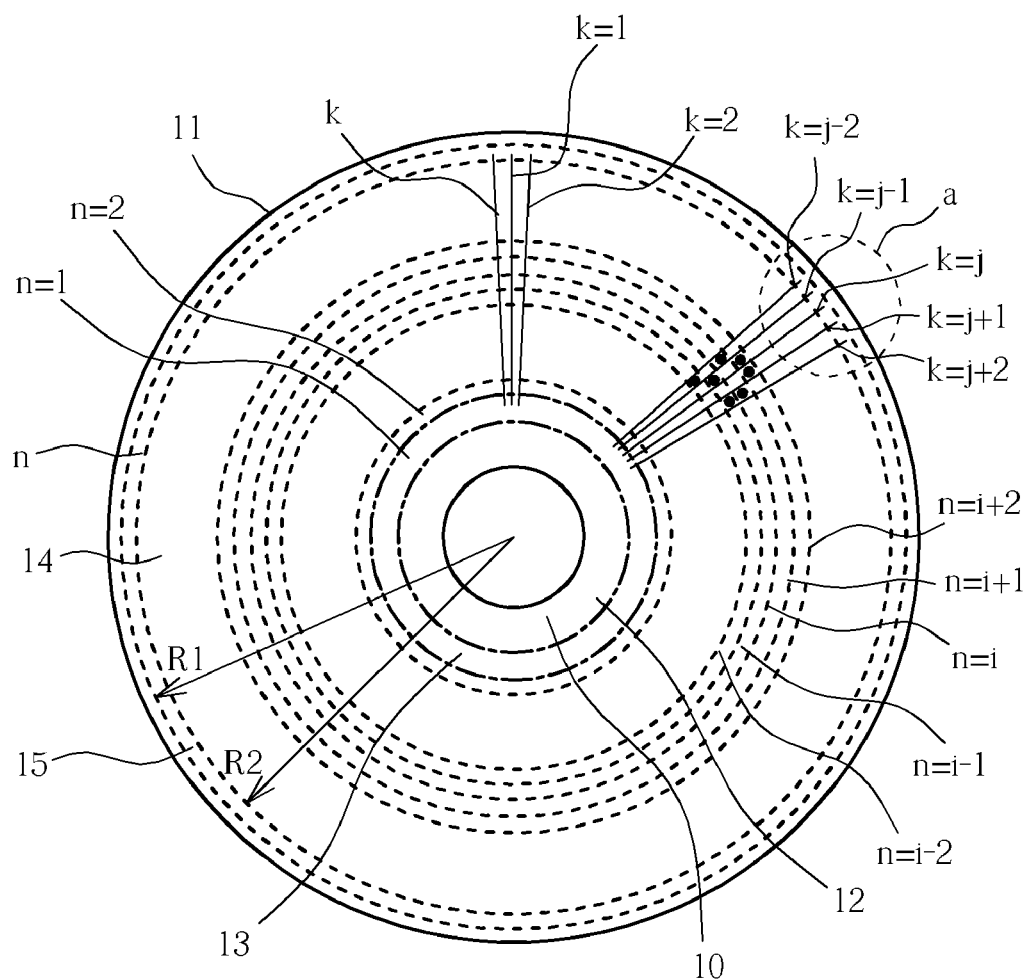
FIG. 2 is a diagram showing a structure of a label side of a label flash optical disc.

FIG. 2 is a diagram showing a structure of a label side of a label flash optical disc. According to the specification of the label flash optical disc, the area of the optical disc from the center hole 10 to the periphery 111 is sequentially defined as a logo area 12, an information area 13, and a drawing area 14. The logo area 12 indicates the logo data of the disc manufacture. The information area 13 indicates information about the label side material, the address, etc. The drawing area 14 ranges from the periphery of the information area 13 to the radius of R1 of the optical disc, where R1=58.5 mm. The material for scribing is spread to a track positioned at 58.5 mm at most. The light scribe application program limits the radius R2 that the drawing area 14 can be labeled to, where R2=58 mm at most. In addition, there is 0.5 mm left unused.

The method for labeling an optical disc according to a preferred embodiment of the invention defines a 0.5 mm width annular area, from R2 to R1, as an indication area 15. The indication area 15 is slotted to several indication blocks corresponding to each drawing block of the drawing area 14. When a drawing block of the drawing area 14 is labeled, an indication block of the indication area 15 corresponding to the labeled drawing block of the drawing area 14 is scribed by the laser beam of the pickup head, e.g. burning a pit or making a phase change as an indication, for indicating the labeled location of the drawing area 14, which provides a reference basis for the next labeling operation.

For example, the drawing area 14 has N drawing tracks ranging from the inner drawing track (n=1) to the outer drawing track (n=N), where N=675 in general. In the radial direction of the optical disc, each drawing track has K blocks numbered from 1 to K, where in general K=500. Assume that between the drawing tracks from n=i−2 to n=i+2 and the blocks from k=j−2 to k=j+2, the drawing blocks (n=i−2, k=j−2), (n=i−1, k=j−1), (n=i−1, k=j+1), (n=i, k=j−2), (n=i, k=j+1), (n=i+1, k=j−1) and (n=i+1, k=j) have been labeled.

Figure 3:
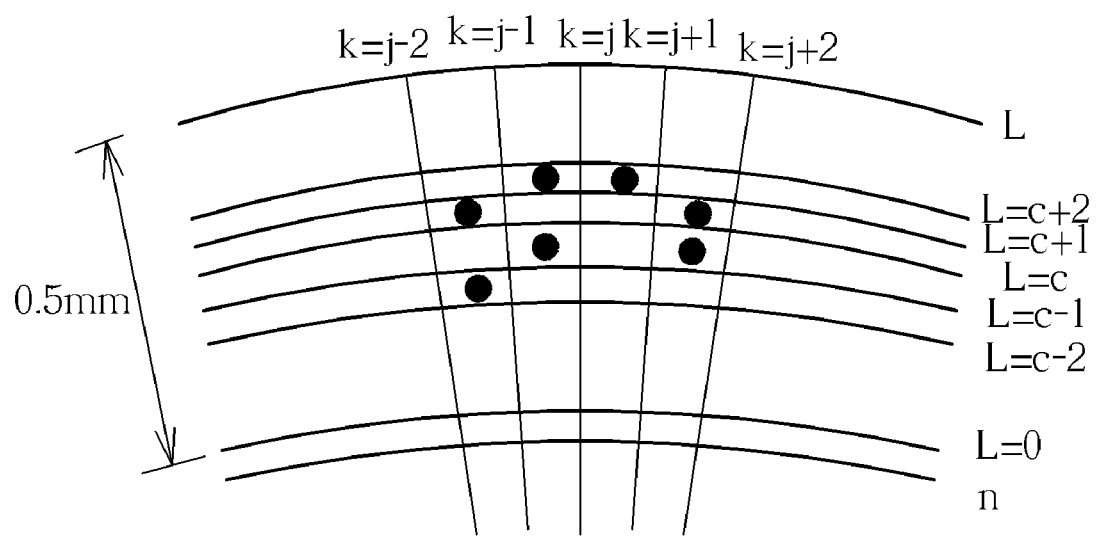
FIG. 3 is a diagram showing particular indication blocks corresponding to drawing blocks that have been scribed.

FIG. 3 is a diagram showing particular indication blocks corresponding to the above-mentioned drawing blocks that have been scribed. The diameter of a conventional laser beam spot generated from the pickup head is less than 0.74 um. As 0.5 mm/0.74 um>675, the indication area 15, being 0.5 mm in annular width, can be slotted into 675 indicating tracks from the indicating track L=1 to the indicating track L=675, corresponding to 675 drawing tracks of the drawing area 14, respectively. The indication area 15 continues using the planning that the drawing area 14 has k blocks in radial direction, where k=500 at most. In the indication area 15, the indication blocks (L=c−2, k=j−2), (L=c−1, k=j−1), (L=c−1, k=j+1), (L=c, k=j−2), (L=c, k=j+1), (L=c+1, k=j−1) and (L=c+1, k=j) corresponding to the labeled drawing blocks in the drawing area 14 have formed labeled block indications.

When the optical disc drive receives a new labeling command from the host, the optical disc drive reads the indication area 15 first for scanning all of the indication blocks. The optical disc drive then transmits the locations of each labeled indication (the location information of labeled drawing blocks) to the host. The light scribe application program, matching up the user requirements, plans blank blocks capable of being labeled. This prevents new labels and old labels from overlapping, which keeps the labels of the optical disc recognizable after the drawing area 14 has been multi-labeled.

Figure 4:
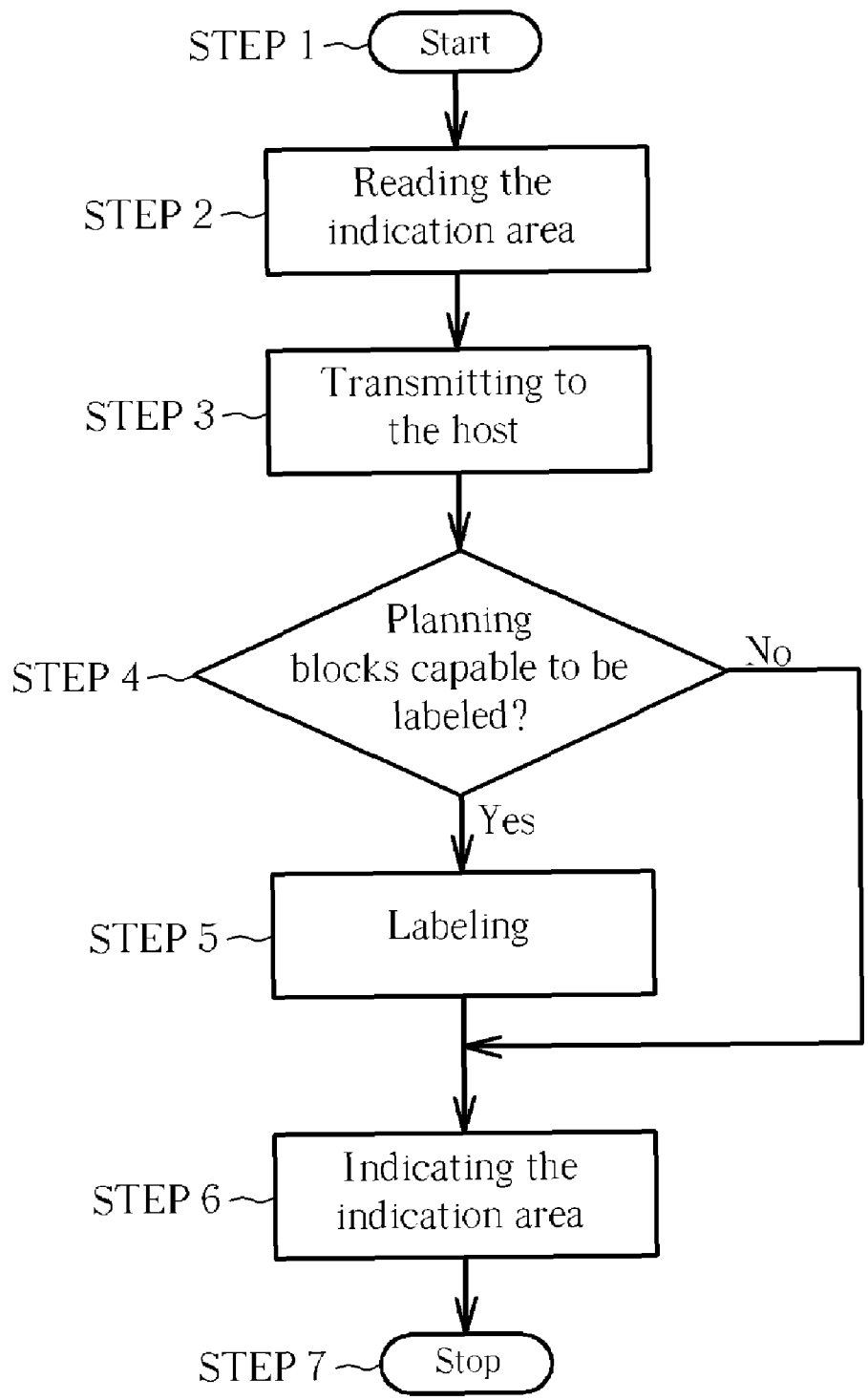
FIG. 4 is a flowchart illustrating a method for labeling an optical disc according to an embodiment of the invention.

FIG. 4 is a flowchart illustrating a method for labeling an optical disc according to an embodiment of the invention. The method gives the detailed steps of recording the location information of labeled drawing blocks by employing the indication area located at the outermost tracks of the labeling side. The steps are as follows:

Step 1: The optical drive receives the command sent from the light scribe application program running on the host to start scribing new label data after the optical disc is inserted into the optical disc drive upside down in order to make the label side face the pickup head.

Step 2: After obtaining the information about the material and characteristic to be burned and the address from the label side, the optical disc drive reads the indication area of the label side for obtaining the recording status of the indication area prior to labeling.

Step 3: The recording status read by the optical disc drive is transmitted to the host.

Step 4: The light scribe application program, matching up the label required by a user, plans blank blocks of the drawing area for proceeding with labeling according to the recording status of the indication area. If the blank blocks of the drawing area are enough for labeling, proceed to the next step. If the blank blocks of the drawing area are not enough for labeling, proceed to Step 7.

Step 5: Label the label data required by the users at the drawing area of the label side according to the blank blocks of the drawing area planned by the light scribe application program running on the host.

Step 6: The optical disc drive moves the pickup head to the indication area of the labeling side and records a labeled mark, such as burning a pit or making a phase change by the emitted laser beam, at the blocks of the indication area corresponding to the blocks of the drawing area labeled in the instant operation.

Step 7: Stop the labeling operation after scribing of user's label on the label side of the optical disc is completed.

By executing the foregoing steps, the method of the present invention utilizes an unused portion of the drawing area of the label side of the optical disc to form the indication area corresponding to the drawing area. The location of label data labeled in each labeling operation is recorded, therefore, the label side can be labeled with new label data during multi-labeling on the label side of the optical disc. In addition, regarding multi-burning on the data recording side of the optical disc, the new content index thereof can be labeled on the label side to be easily identifiable by the user.

Meanwhile, the drawing area and the indication area of the foregoing method for labeling optical discs is illustrated with a point-to-point mapping relationship; however, people skilled in the art should readily appreciate that one block of the indication area can be configured to correspond to a sub-code frame block, a sector block, a track number block or a block with a bigger area of the drawing area for utilizing the indication area to indicate the whole label data with higher resolution. These alternative designs all fall within the scope of the present invention.

Those skilled in the art will readily observe that numerous modifications and alterations of the device and method may be made while retaining the teachings of the invention.

What is claimed is:

1. A method for labeling an optical disc, comprising:
   (a) starting labeling;
   (b) reading an indication area of the optical disc to obtain an information of labeling;
   (c) planning at least one block capable of being labeled in a drawing area of the optical disc;
   (d) labeling a label onto the drawing area according to the block capable of being labeled;
   (e) recording an indication at a block of the indication area corresponding to the label labeled onto the drawing area; and
   (f) stopping labeling.

2. The method of claim 1, wherein the step (a) further comprises:
   playing the optical disc by an optical disc drive; and
   starting labeling when the optical disc drive receives a labeling command.

3. The method of claim 2, wherein the optical disc drive is coupled to a host and receives the labeling command of a light scribe application program of the host to start labeling.

4. The method of claim 3, wherein the step (b) further comprises:
   transmitting the information of labeling to the host.

5. The method of claim 1, wherein the indication area of the optical disc is located in the drawing area of the optical disc.

6. The method of claim 5, wherein the indication area of the optical disc is located at an outermost annular area within the drawing area of the optical disc.

7. The method of claim 6, wherein the outermost annular area is located within a radius from 58 mm to 58.5 mm of the optical disc.

8. The method of claim 6, wherein a number of tracks in the outermost annular area is equal to a number of tracks in the drawing area.

9. The method of claim 8, wherein the number of tracks in the outermost annular area is 675.

10. The method of claim 8, wherein the outermost annular area is slotted into a plurality of blocks by planning a plurality of tracks and a plurality of regions in a radial direction.

11. The method of claim 6, wherein one block of the indication area and one block of the drawing area have a point-to-point mapping relationship.

12. The method of claim 6, wherein one block of the indication area corresponds to one subcode frame block of the drawing area.

13. The method of claim 6, wherein one block of the indication area corresponds to one track number block of the drawing area.

14. The method of claim 6, wherein one block of the indication area corresponds to one sector block of the drawing area.

15. The method of claim 6, wherein the indication area of the optical disc is an unused area of the drawing area.

16. The method of claim 1, wherein step (c) comprises:
   when planning the block capable of being labeled fails, proceeding to step (f); and
   when planning the block capable of being labeled is successful, proceeding to step (d).

17. The method of claim 16, wherein the step (c) is processed according to a label required by a user and the information of labeling obtained in step (b).

18. The method of claim 16, wherein the block capable of being labeled planned in the step (c) is a blank block.

19. The method of claim 18, wherein the label labeled in the step (d) is labeled in the blank block.

20. The method of claim 1, wherein the indication recorded in the step (e) is a labeled mark.

* * * * *